(No Model.)
J. ESCH.
TRUCK.
No. 320,860. Patented June 23, 1885.
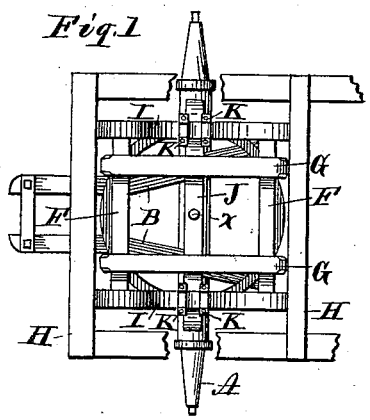
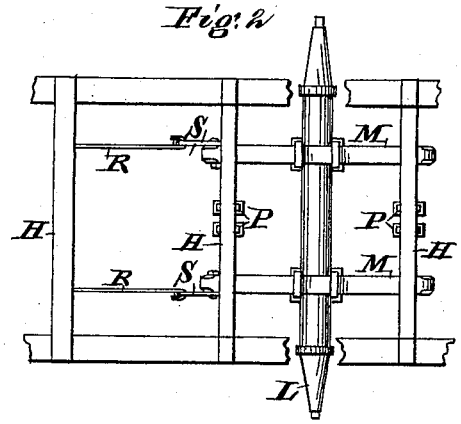
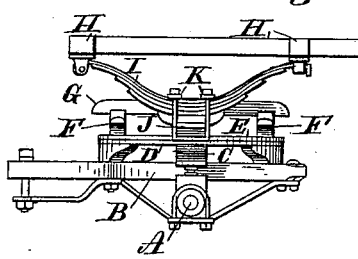
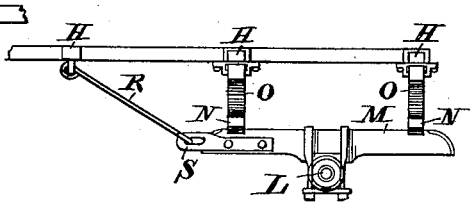
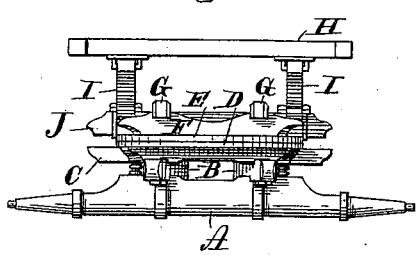
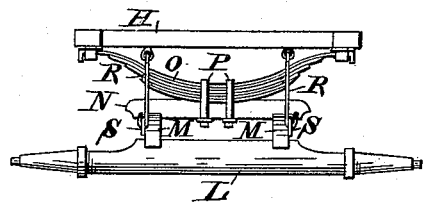
Witnesses
G. M. Gridley
Matthew J. Schinner
John Esch
Inventor
By Ermin T. Benedict
Attorneys

UNITED STATES PATENT OFFICE.

JOHN ESCH, OF MILWAUKEE, WISCONSIN.

TRUCK.

SPECIFICATION forming part of Letters Patent No. 320,860, dated June 23, 1885.

Application filed January 29, 1885. (No model.)

*To all whom it may concern:*

Be it known that I, JOHN ESCH, a citizen of the United States, residing at Milwaukee, in the county of Milwaukee and State of Wisconsin, have invented certain new and useful Improvements in Trucks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention, to be hereinafter distinctly claimed, relates to improvements in heavy wagons or trucks, and is an improvement on and addition to the devices heretofore secured to me in and by Letters Patent of the United States No. 252,363, issued January 17, 1882, to which, for a more perfect understanding hereof, reference may be had.

In the accompanying drawings, Figure 1 is a top view of that part of a truck embodying my invention over the front axle. Fig. 2 is a top view of the gear and frame over the rear axle. Fig. 3 is a side view of the front gear. Fig. 4 is a side view of the rear gear. Fig. 5 is a rear view of the front gear, and Fig. 6 is a front view of the rear gear.

The same letters refer to like parts in all the views.

A is the front axle, and B B are the hounds thereon. C is the sand-bar above the hounds and parallel with the axle, and supporting thereon the lower circle, D. The axle A, hounds B B, sand-bar C, and lower circle, D, are bolted and strapped together rigidly.

The upper circle, E, is of the same size with and bears uniformly upon the lower circle, and has a reciprocal rotary movement thereon.

The cross-bars F F and longitudinal bars G G thereon are bolted to and supported on the upper circle, E, and strengthen and retain the circle in its true position, and in my truck shown in Patent No. 252,363 are extended into and become the trusses that support the wagon-bed; but in this truck I substitute for supporting the wagon-bed the half-elliptic springs I I, which springs are supported at their downwardly-extending middle part on the cross beam or bar J, which lies upon and is bolted to the upper circle, E. The springs I I are rigidly affixed to the beam J by the straps and nuts K K, and at the upper and outer ends are attached to the under side of the frame H of the truck-bed in lugs, so as to have a slight movement therein to permit extension of the springs lengthwise, caused by their depression or closing inwardly under pressure or otherwise. The parts of the front gear above and attached to the upper circle are connected movably with the parts below and attached to the lower circle by the ordinary king-bolt, X.

The rear axle, L, supports thereon, rigidly strapped thereto, the bars or trusses M M at right angles to the axle, above and upon which trusses, and at right angles thereto, are supported the cross-bars N N, upon which rest the half-elliptic springs O O, parallel therewith lengthwise, and affixed thereto by the strap-bolts and nuts P P. At their upper and outer ends said springs support the frame H of the truck-bed, the ends of the springs being attached thereto in lugs or staples, having therein a slight movement, to permit of their extension endwise under pressure or otherwise.

In front of the rear gear, attached to the under side of the wagon-bed, are the brace-rods R R, extending downwardly rearwardly to the front ends of the trusses M M, respectively, to which they are attached by and through the slotted lugs S S, rigidly affixed to said trusses at their front ends, the said rods at their lower rear ends being so hooked into the slot in said lugs as to permit a slight movement forward and backward therein to accommodate the movement given these rods by the compressing and relaxing of the springs. These rods, after allowing for the movement caused by the compressing and relaxing of the springs, are adapted to hold the wagon-bed firmly against any forward or backward upsetting strain on the supporting-axles, whereby, if unprovided against, the springs or other gear might be overthrown and broken or otherwise injured or destroyed.

Over the forward axles I place the two supporting-springs lengthwise of the wagon-bed, and over the rear axle I place the springs crosswise of the wagon-bed.

It will be seen that by my improvements, while I provide springs for my truck whereby heavy loads may be easily and smoothly carried over rough roads, I also provide against strain to the truck or parts thereof by the devices and way of attachment thereof, hereinbefore set forth.

What I claim as new, and desire to secure by Letters Patent, is—

1. In trucks, the combination of the truck's bed-frame H and the supporting-springs I I and O O, in pairs over the front and rear axles, respectively, one pair being placed lengthwise and the other crosswise of the truck-bed, said springs being supported at their middle, and having a slight movement in lugs at their outer ends, substantially as set forth.

2. In trucks, the combination of the bed-frame H, the supporting-springs I I and O O, in pairs, one pair lengthwise and the other crosswise of the bed, and supported in such pairs upon trusses over the front and rear axles, respectively, and the brace rods R R, attached at one end to the bed-frame H and at the other end to the trusses M M, and having movement as described, substantially as set forth.

In testimony whereof I affix my signature in presence of two witnesses.

JOHN ESCH.

Witnesses:
C. T. BENEDICT,
JAS. B. ERWIN.